(12) United States Patent
Baidas et al.

(10) Patent No.: US 9,628,255 B1
(45) Date of Patent: Apr. 18, 2017

(54) METHODS AND APPARATUS FOR TRANSMITTING DATA OVER A CLOCK SIGNAL

(71) Applicant: Integrated Device Technology, Inc., San Jose, CA (US)

(72) Inventors: Zaher Baidas, Kanata (CA); Bogdan Staicu, Ottawa (CA); Menno Tjeerd Spijker, Ottawa (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/975,226

(22) Filed: Dec. 18, 2015

(51) Int. Cl.
*H04L 7/00* (2006.01)

(52) U.S. Cl.
CPC .................. *H04L 7/0012* (2013.01)

(58) Field of Classification Search
CPC ....... H04L 7/00; H04L 7/0012; H04L 7/0079; H04L 7/0083; H04L 7/0087; H04L 7/0091; H04L 7/02; H04L 7/027; H04L 7/0274; H04L 7/0033; H04L 7/00331
USPC ....... 375/328, 354, 356, 360, 362, 364, 376; 370/350, 509, 510
See application file for complete search history.

(56) References Cited

U.S. PATENT DOCUMENTS

| | | | |
|---|---|---|---|
| 5,502,711 A | 3/1996 | Clark et al. | |
| 7,227,476 B1* | 6/2007 | Wong | H03M 5/08 341/53 |
| 8,285,884 B1* | 10/2012 | Norrie | G06F 13/4278 710/14 |
| 8,362,819 B1* | 1/2013 | Kris | H03K 7/08 327/172 |
| 2003/0093702 A1 | 5/2003 | Luo et al. | |
| 2006/0001494 A1 | 1/2006 | Garlepp et al. | |
| 2010/0330931 A1 | 12/2010 | Uehara et al. | |
| 2012/0314738 A1* | 12/2012 | Kashima | H04L 12/403 375/219 |
| 2013/0169173 A1* | 7/2013 | Chen | H05B 37/02 315/186 |
| 2015/0263849 A1 | 9/2015 | Terao | |
| 2015/0286606 A1* | 10/2015 | Sengoku | G06F 13/364 710/110 |

* cited by examiner

*Primary Examiner* — Young T Tse
(74) *Attorney, Agent, or Firm* — Myers Bigel & Sibley

(57) ABSTRACT

A method of operating a clock circuit can include transmitting a clock signal from a transmitter of a first system to a receiver of a second system, where a first repeating edge of a clock cycle of the clock signal repeats at a predetermined constant frequency within the clock signal to synchronize operations of the second system, and varying, by the first system, a second edge within the clock cycle of the clock signal to transmit a data transmission within the clock signal.

20 Claims, 9 Drawing Sheets

METHODS AND APPARATUS FOR TRANSMITTING DATA OVER A CLOCK SIGNAL

FIELD OF THE INVENTION

The present inventive concepts relate to methods, systems and integrated circuits for clock distribution for system synchronization.

BACKGROUND

Circuits and systems operating simultaneously can share a reference signal that establishes a common time signal with which operations can be coordinated. One method with which this can be accomplished is with a clock signal that repeats at a given frequency and oscillates between a high and a low state.

Systems connected to the clock signal can synchronize their operations to the clock signal transitions. These synchronized operations can be used in signal processing, data transmission, and/or other types of time-sensitive data operations.

As a clock signal is shared across physical distances, the characteristics of the transmission medium as well as the distance itself can introduce skew into the clock signal as it is perceived by those elements of the system receiving the signal.

For example, clock signals can be implemented across the backplane of a communication system. A "master" clock can generate a master clock signal which is distributed to other elements of the system receiving the clock. These other elements may be timing cards or other types of integrated circuits. Because these signals may experience skew over the transmission distance, the system can provide other time synchronization elements to ensure that the elements receiving the clock signal are correctly synchronized.

One such time synchronization element is a pulse per second (PPS) signal. In traditional systems a PPS signal may have a width of less than one second that repeats once per second. Because the PPS signal specifies a periodic designation of a second and not the actual time, it can be combined with other time source data that provides the full date and time to accurately establish the current time.

One type of signal that can establish the current time is an Inter-Range Instrumentation Group time code (IRIG), such as the IRIG Standard 200-04, a standardized time code developed by the United States Range Commanders Council. The TRIG standard discusses the transmission of time information in a number of different time formats, all with distinct advantages and disadvantages depending on the particular application. IRIG time codes may allow for the transfer of time information between systems by encoding the specific time, including seconds, minutes, hours, days, etc. within the signal through the use of varying the width of pulses defined within specific time frames. IRIG time code is made up of repeating frames, each containing 60 or 100 bits. The bits are numbered from 0 through 59 or 99. The frame time, or the time needed to transfer a time signal, ranges from 10 ms to 1 hour.

Traditionally a clock signal may be transmitted on a backplane of a communication system between cards for synchronization purposes.

SUMMARY

Aspects of the present inventive concepts may provide methods and circuits capable of transmitting a data transmission encoded within a clock signal shared between systems for synchronization purposes.

According to example embodiments of the present inventive concepts, a method of operating a clock circuit may include transmitting a clock signal, from a transmitter of a first system to a receiver of a second system, and varying, by the first system, a second edge of the clock cycle within the clock signal to transmit a data transmission within the clock signal. The first repeating edge of a clock cycle within the clock signal may repeat at a predetermined constant frequency within the clock signal to synchronize operations of the second system.

In some embodiments, the clock cycle within the clock signal may include a period between a first occurrence of the first repeating edge of the clock cycle within the clock signal and a second occurrence of the first repeating edge of the clock signal following, and directly time adjacent to, the first occurrence of the first repeating edge of the clock cycle within the clock signal.

In some embodiments, varying, by the first system, the second edge of the clock cycle within the clock signal may include pulse width modulating the clock cycle within the clock signal to provide a pulse width between the first repeating edge and the second edge responsive to a data input to the first system.

In some embodiments, the first system may vary the second edge of the clock cycle within the clock signal to transmit the data transmission within the clock signal by providing the pulse width according to a first pulse width to encode a logical zero in the data transmission and providing the pulse width according to a second pulse width to encode a logical one in the data transmission.

In some embodiments, the first system may pulse width modulate the clock cycle within the clock signal according to one of at least the first pulse width, the second pulse width, or a third pulse width.

In some embodiments, the first pulse width may be one-fourth of the clock cycle, the second pulse width may be three-quarters of the clock cycle, and the third pulse width may be one-half of the clock cycle.

In some embodiments, the first system may transmit the data transmission within the clock signal by further encoding the data transmission into a plurality of data symbols, where a data symbol of the plurality of data symbols may be encoded with a combination of data bits comprising the logical one and/or the logical zero, and transmitting the data symbol within the clock signal by pulse width modulating respective ones of a plurality of the clock cycles within the clock signal to be the logical one or the logical zero.

In some embodiments, the data symbol may include a symbol ONE, a symbol ZERO, or a symbol SPACE.

In some embodiments, the data transmission within the clock signal may include a pulse per second data transmission to calibrate a clock of the second system.

According to example embodiments of the present inventive concepts, an encoding circuit for a clock signal may include a transmitting circuit configured to transmit the clock signal to synchronize operations of a second system and a processing circuit. The processing circuit may be configured to perform operations including encoding a data transmission for the second system into a plurality of data symbols, transmitting, from the transmitting circuit to a receiver of the second system the clock signal, and varying a second edge of the clock cycle within the clock signal so as to transmit a data transmission within the clock signal. A data symbol of the plurality of data symbols may be encoded with a combination of data bits comprising a logical one and/or a logical zero. A first repeating edge of a clock cycle within the clock signal may repeat at a predetermined constant frequency within the clock signal to synchronize operations of the second system.

In some embodiments, the clock cycle within the clock signal may include a period between a first occurrence of the first repeating edge of the clock cycle within the clock signal and a second occurrence of the first repeating edge of the clock signal following, and directly time adjacent to, the first occurrence of the first repeating edge of the clock cycle within the clock signal.

In some embodiments, varying the second edge of the clock cycle within the clock signal comprises pulse width modulating the clock cycle within the clock signal to provide a pulse width between the first repeating edge and the second edge responsive to a data input to the first system.

In some embodiments, the processing circuit may vary the second edge within the clock cycle of the clock signal so as to transmit the data transmission within the clock signal by, providing the pulse width according to a first pulse width to encode the logical zero in the data transmission, and providing the pulse width according to a second pulse width to encode the logical one in the data transmission.

In some embodiments, wherein the processing circuit may pulse width modulate the clock cycle within the clock signal according to one of at least the first pulse width, the second pulse width, or a third pulse width.

In some embodiments, the processing circuit may vary the second edge within the clock cycle of the clock signal so as to transmit the data transmission within the clock signal by further transmitting the data symbol within the clock signal by pulse width modulating respective ones of a plurality of clock cycles within the clock signal to be the logical one or the logical zero.

In some embodiments, the data symbol may include a symbol ONE, a symbol ZERO, or a symbol SPACE.

In some embodiments, the data transmission within the clock signal may include a pulse per second data transmission to calibrate a clock of the second system.

In some embodiments, the processing circuit may be further configured to perform operations including receiving a pulse per second indication at the processing circuit to be transmitted to the second system, terminating a first data transmission in progress to the second system, transmitting the pulse per second data indication as a second data transmission to the second system, and retransmitting the first data transmission to the second system after completion of the second data transmission.

According to example embodiments of the present inventive concepts, a decoding circuit for a clock signal may include a receiving circuit configured to receive the clock signal from a second system and a processing circuit. The processing circuit may be configured to perform operations including receiving, from a transmitter of the second system, the clock signal, decoding a data transmission encoded by the second system from the clock signal into a plurality of data symbols, and performing operations responsive to the data transmission that is received from the second system. A first repeating edge of a clock cycle within the clock signal may repeat at a predetermined constant frequency within the clock signal to synchronize operations of the second system. The data transmission may be encoded by varying a second edge of the clock cycle within the clock signal.

In some embodiments, the clock cycle within the clock signal may include a period between a first occurrence of the first repeating edge of the clock cycle within the clock signal and a second occurrence of the first repeating edge of the clock signal following, and directly time adjacent to, the first occurrence of the first repeating edge of the clock cycle within the clock signal.

In some embodiments, a data symbol of the plurality of data symbols received may be encoded with a combination of data bits comprising a logical one and/or a logical zero.

In some embodiments, decoding the data transmission encoded by the second system from the clock signal into a plurality of data symbols may include detecting a varying pulse width between the first repeating edge and the second edge of the clock cycle within the clock signal.

In some embodiments, wherein the processing circuit may decode the data transmission within the clock signal by detecting the varying pulse width according to a first pulse width to decode the logical zero in the data transmission, and detecting the varying pulse width according to a second pulse width to decode the logical one in the data transmission.

In some embodiments, wherein the processing circuit may detect the varying pulse width of the clock cycle within the clock signal according to one of at least the first pulse width, the second pulse width, or a third pulse width.

In some embodiments, wherein the data symbol may include a symbol ONE, a symbol ZERO, or a symbol SPACE.

In some embodiments, the data transmission within the clock signal may include a pulse per second data transmission to calibrate a clock.

In some embodiments, the processing circuit may be further configured to perform operations including receiving in a first data transmission within the clock signal an indication that a pulse per second transmission is available from the second system, terminating a first data transmission in progress from the second system, receiving the pulse per second data transmission as a second data transmission from the second system, and receiving the first data transmission from the second system after completion of the second data transmission.

In some embodiments, the decoding circuit may be contained within a phase-lock loop control system.

In some embodiments, the receiving circuit may be configured to receive the clock signal from the second system over an electronic transmission medium coupling the second system to the receiving circuit.

In some embodiments, the first repeating edge and the second repeating edge may both be received via the electronic transmission medium.

BRIEF DESCRIPTION OF THE DRAWINGS

The accompanying drawings, which are incorporated in and constitute a part of the specification, illustrate embodiments of the inventive concepts and, together with the description, serve to explain principles of the inventive concepts. Like numbers refer to like elements throughout the illustrations.

DETAILED DESCRIPTION

The present inventive concepts now will be described hereinafter with reference to the accompanying drawings and examples, in which embodiments of the inventive concepts are shown. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art.

According to embodiments of the present inventive concepts, a transmission circuit may encode a data transmission within a clock signal used to synchronize operations between systems. The data transmission may be encoded within the clock signal by varying a second edge of respective clock cycles in the clock signal while maintaining a first edge at a predetermined constant repeating frequency. By varying a width of portions of the signal between the first and the second edge of the clock cycle, the transmitter can encode data bits which can then be decoded by one or more receivers of the signal.

The present inventive concepts utilize the pulse width of a main synchronization clock to encode a synchronization pulse and/or a data communication channel on a single line. By manipulating one of the edges of the clock, such as an edge that is not used for synchronization, the duty cycle can be adjusted (for example, 25%, 50%, 75%). The adjusted duty cycle may be used to encode frames that mark the synchronization pulse location and may use the frame to transmit and receive other communication data. The communication channel may then be used to synchronize a number of other systems, such as a PLL, across a system backplane by transmitting synchronization data (phase and frequency information). These methods may allow embedding a number of virtual references within the main clock reference.

Embodiments of the present inventive concepts may allow embedding a marker and data channel in parallel, and may also employ the data channel to synchronize remote PLLs across the backplane using the data channel and the carrier edge of the clock signal as references.

Figure 1:
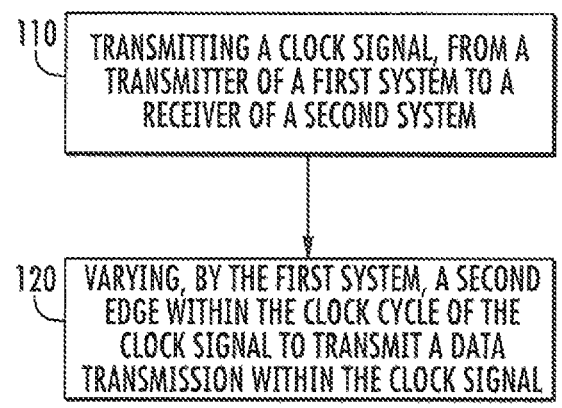
FIG. 1 is a flowchart illustrating operations of a method for operating a clock circuit according to some embodiments of the present inventive concepts.

FIG. 1 is a flowchart illustrating operations of a method for operating a clock circuit according to some embodiments of the present inventive concepts. As illustrated in FIG. 1, the method may involve a step 110 of transmitting a clock signal from a transmitter in a first system to a receiver in a second system. The first and second systems may be communicatively coupled via an electronic transmission medium, and the clock signal may pass over the electronic transmission medium. In some embodiments, the first and second systems may be connected via a backplane of a communication system or other data processing system.

The clock signal may have a first repeating edge of a clock cycle of the clock signal that repeats at a predetermined constant frequency with the clock signal to synchronize operations of the second system. Within the scope of the present inventive concepts, a constant predetermined frequency will be understood to mean a frequency known by both the first system and second system. The second system may be configured to synchronize operations based on at least one of the repeating edges of the clock cycle of the clock signal. The constant predetermined frequency may refer to the frequency at which a first edge of the clock signal repeats. In some embodiments, the first repeating edge may be an edge of the clock signal that is specified to vary within a predetermined range with a predetermined tolerance, and is used by a system's designer to configure the synchronization of different components or systems.

The method may further involve a step 120 including varying, by the first system a second edge within the clock cycle of the clock signal to transmit a data transmission within the clock signal. Varying the second edge of the clock cycle may include pulse width modulating the clock signal between the first edge of the clock signal repeating at the predetermined constant frequency and the second edge. Other types of variation of the second edge may also be used. This variation may allow for the encoding of a data signal within the clock signal itself.

The data signal being encoded by the first system may be encoded by the first system responsive to receipt of data to be transferred to the second system. In other words, the first system may receive data to be transferred to the second system as input from yet another system. In some embodiments, the first system may generate the data to be transferred to the second system internally.

The data transferred to the second system may include a time of day transmission, a pulse synchronization signal, a data read command, and/or a data write command, but the present inventive concepts are not limited thereto. In some embodiments, the first system may issue a data transmission to the second system over the clock signal and receive a reply to the data transmission via some other signal. For example, the first system may issue a data read command data transmission over the clock signal to the second system and receive the data in response to the read command from the second system over another signal. The signal used for the response from the second system may be another clock signal, such as a return clock signal from the second system, but the present inventive concepts are not limited thereto.

Figure 2:
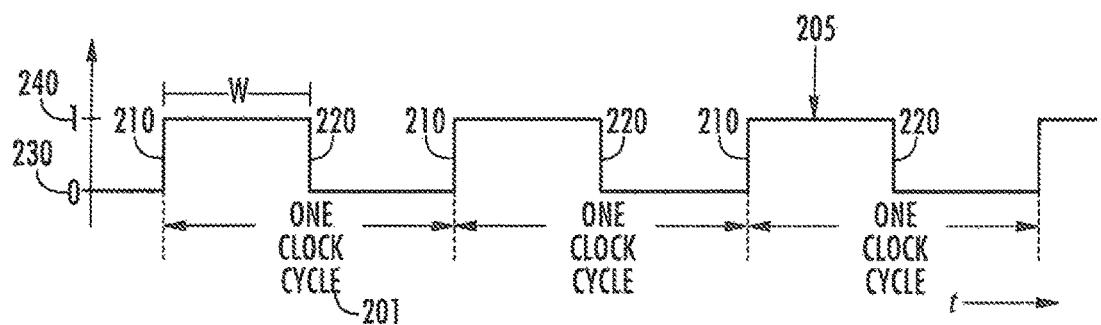
FIG. 2 is a timing diagram illustrating a clock signal for synchronizing systems according to some embodiments of the present inventive concepts.

FIG. 2 is a timing diagram illustrating a clock signal for synchronizing systems according to some embodiments of the present inventive concepts.

As illustrated in FIG. 2, a clock signal 205 may include a number of repeating clock cycles 201. The clock cycles 201 may repeat at a particular frequency. In some embodiments, this frequency may be a constant predetermined frequency.

A clock cycle 201 may include at least one transition 210 from a first state to a second state. For example, a clock cycle 201 may include a transition 210 from a low state 230 to a high state 240. The low state 230 and the high state 240 may represent voltage levels of the clock signal 205 and may correspond to logical levels of the clock signal 205. For example, a high state 240 may correspond to a logical "high," or "true," or "one," while a low state 230 may correspond to a logical "low," "false," or "zero," though the present inventive concepts are not limited thereto.

The first transition 210 of the clock signal 205 within the clock cycle 201 may be known as a first edge 210. The first edge 210 may also be known as a leading edge. When the transition 210 is from a low state 230 to a high state 240, the transition 210 may be known as a rising edge. The frequency of the clock cycle 201 of the clock signal 205 may be defined by the period between a first occurrence of the first edge 210 and second repeating occurrence of the first edge 210 which is directly time adjacent to the first occurrence of the first edge 210.

The clock cycle 201 may further comprise a second transition 220 from the second state to the first state. In some embodiments, this may be a transition from the high state 240 to the low state 230. The second transition 220 may be a second edge 220 of the clock cycle 201. The second edge 220 may also be known as a trailing edge. When the transition 220 is from a high state 240 to a low state 230, the transition 220 may be known as a falling edge. The second edge 220 may also repeat within respective ones of the clock cycles 201, but the second edge 220 may not repeat with a constant frequency. In other words, the timing of the second edge 220 may vary within respective clock cycles 201 of the clock signal 205 while the repeating frequency of the first edge 210 may be constant.

In some embodiments the second edge may transition from the second state to a third state. The third state may be a state between the first state and in the second state. That is to say that the third state may be a voltage of the clock signal 205 that is between the high state 240 and the low state 230. In some embodiments the third state may be greater than the first state. That is to say that the third state may be a voltage of the clock signal 205 that is greater than the high state 240.

The clock cycle 201 of the clock signal 205 may have a pulse width W. The pulse width W may be a width (or time) of the signal between the first edge 210 and the second edge 220. In accordance with the present inventive concepts, varying the timing of the second edge 220 within the clock cycle 201 may vary the width (or duration) W of the clock cycle 201 without altering the frequency and/or timing of the first edge 210.

Though shown in FIG. 2 as a rising edge, it will be understood by those of skill in the art that the first edge 210 could be a falling edge and the second edge 220 could be a falling edge without altering the present inventive concepts. That is to say that the clock cycle 201 of the clock signal 205 could begin with a transition from a low state 230 to a high state 240.

FIG. 1 illustrates only a first edge 210 and a second edge 220 within the clock cycle 201. However, embodiments of the present inventive concepts may include additional edges of the clock signal 205 within the clock cycle 201. Additional edges of the clock signal 205 may be transitions between additional voltages of the clock signal 205. For example, the first edge 210 of the clock cycle 201 may be a transition from the low state 230 to the high state 240. The second edge 220 of the clock cycle 201 may be a transition from the high state 240 to a third state between the high state 240 and the low state 230. A third edge of the clock cycle may be a transition from the third state to the low state 230. One of skill in the art will recognized that additional edges at additional states will be possible within the clock cycle 201 while still keeping within the present inventive concepts.

Figure 3A:
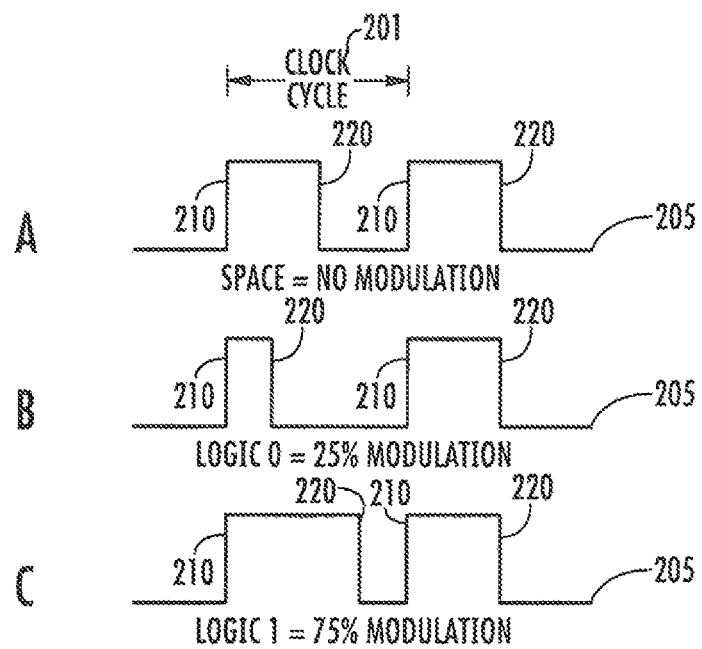
FIGS. 3A and 3B are timing diagrams illustrating clock signals for synchronizing systems and transmitting data according to some embodiments of the present inventive concepts.
Figure 3B:
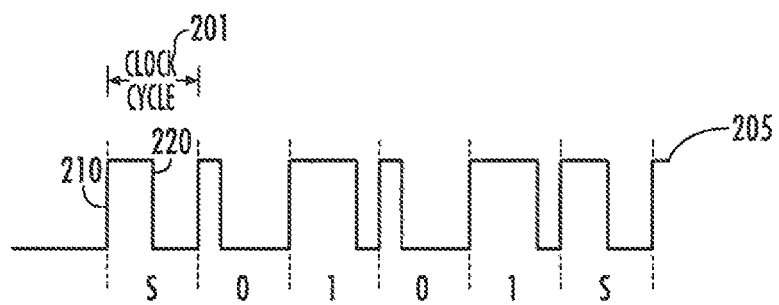

FIGS. 3A and 3B are timing diagrams illustrating clock signals 205 for synchronizing systems and transmitting data according to some embodiments of the present inventive concepts.

Three examples of modulation options are illustrated in FIG. 3A. Example A illustrates a clock signal 205 with a 50% duty cycle. In some embodiments, a 50% duty cycle corresponds to the first edge 210 occurring at the beginning of a clock cycle 201 and the second edge 220 occurring halfway through the clock cycle 201. This example corresponds to a standard clock signal and employs no modulation. Within the clock signal 205, a clock cycle 201 with no modulation may not be correlated with any data. In some embodiments, a clock cycle 201 with no modulation may be interpreted as a space, which may be used for data marking within the data transmission.

Example B illustrates a clock signal 205 with a duty cycle of less than 50%. In some embodiments, a duty cycle of less than 50% may correspond to 25%, but the present inventive concepts are not limited thereto. A 25% duty cycle corresponds to the first edge 210 occurring at the beginning of a clock cycle 201 and the second edge 220 occurring one quarter of the way through the clock cycle 201. Within the clock signal 205, a clock cycle 201 with modulation of less than 50% may be correlated with a first data bit.

Example C illustrates a clock signal 205 with a duty cycle of greater than 50%. In some embodiments, a duty cycle of greater than 50% may correspond to 75%, but the present inventive concepts are not limited thereto. A 75% duty cycle corresponds to the first edge 210 occurring at the beginning of a clock cycle 201 and the second edge 220 occurring three quarters of the way through the clock cycle 201. Within the clock signal 205, a clock cycle 201 with modulation of greater than 50% may be correlated with a second data bit.

It will be understood that though FIG. 3A illustrates only three potential pulse widths, other widths are possible without deviating from the present inventive concepts. Similarly, though two data bits and a space are illustrated, more data bits and/or alternate signal markers are possible corresponding to various and alternative widths without deviating from the present inventive concepts.

FIG. 3B illustrates a clock signal 205 encoded with a data transmission according to the present inventive concepts. The clock signal 205 may include multiple pulse widths between respective first edges 210 and second edges 220 which may correspond to respective data bits which can be decoded from the clock signal 205.

In some embodiments, these data bits can directly correspond to data bits of the data transmission. In some embodiments, the data bits may be further combined to be translated into symbols for the data transmission. For example, two adjacent data bits could be used for encoding additional symbols. In some embodiments, when the two bits equal a "00," a symbol corresponding to a SPACE may be decoded. In some embodiments, when the two bits equal a "01," a symbol corresponding to a ZERO may be decoded. In some embodiments, when the two bits equal a "10," a symbol corresponding to a ONE may be decoded. In some embodiments, when the two bits equal a "11," an error may be generated. It will be understood by one of skill in the art that other bit combinations are possible, as well as the use of additional bits for signal encoding and/or other additional symbols, without deviating from the present inventive concepts.

Figure 4:
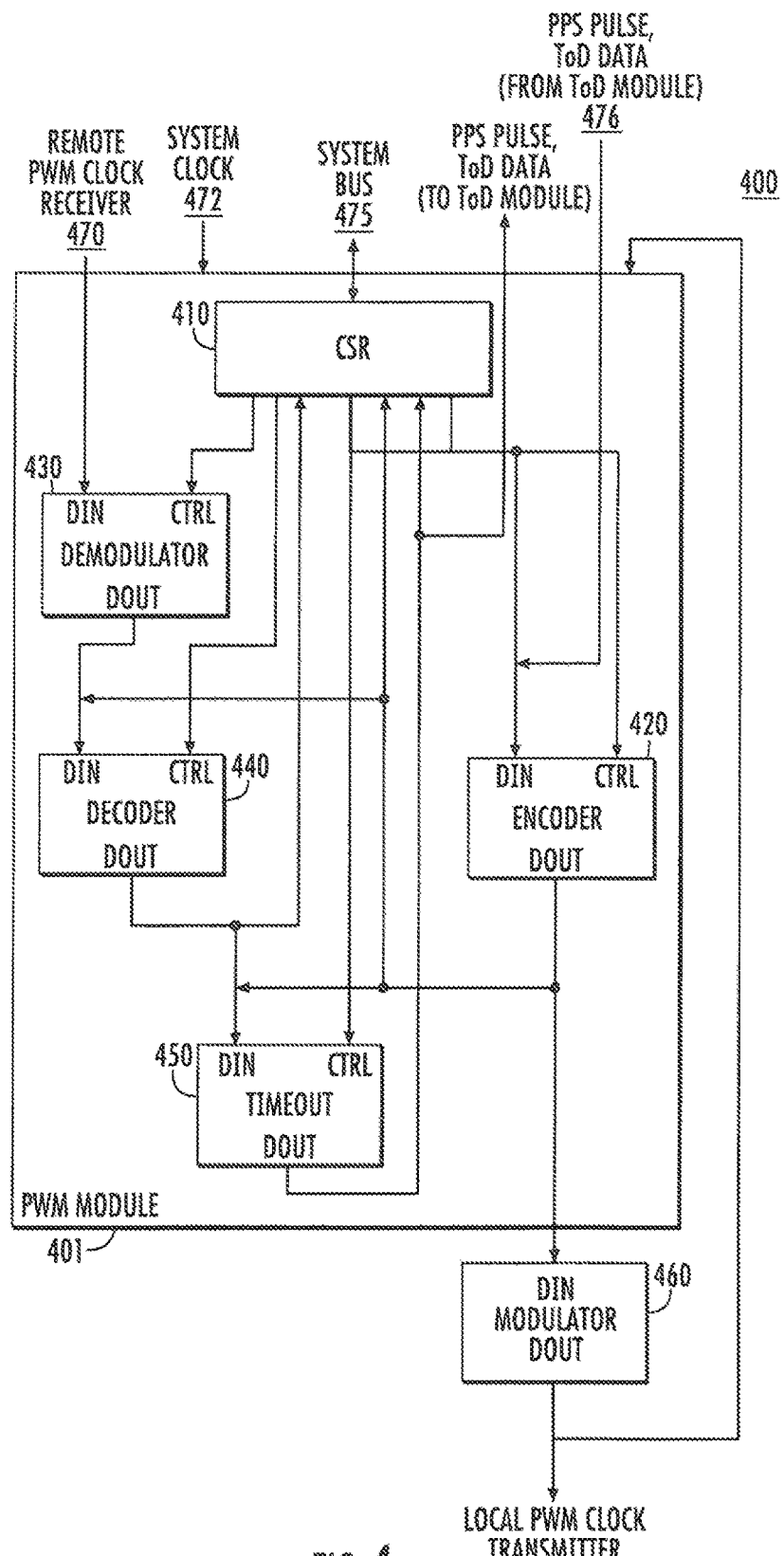
FIG. 4 is a block diagram of a pulse width modulation architecture according to some embodiments of the present inventive concepts.

FIG. 4 is a block diagram of a pulse width modulation (PWM) architecture 400 according to some embodiments of the present inventive concepts.

The PWM architecture 400 embodied by a PWM module 401 according to some embodiments of the present inventive concepts may consist of a control and status registers (CSR) module 410, an encoder 420, a demodulator 430, a decoder 440, and a timeout module 450. The PWM architecture 400 may also include a modulator 460 external to the PWM modules 401. In some embodiments, the PWM module 401 may be contained within a PWM transmitter and configured to transmit a master clock signal to other PWM receivers. In some embodiments, the PWM module 401 may be contained within a PWM receiver and configured to transmit a return clock signal to a master clock source.

The CSR 410 may contain all status and control registers. It may also contain a first-in, first-out buffer (FIFO) that stores command control bits and writes data for frames to be transmitted by the PWM module 401. The CSR 410 may also contain a received frames FIFO.

Control and status registers may be located in the CSR module 410. The CSR module 410 may be connected to a system bus 475 of an external processor or other system architecture. Through this bus 475, the external processor may read and write PWM control and status registers in the CSR module 410. To send a data frame encoded within the clock signal 205, such as a synchronization or write command, the external processor may send write data and/or frame control data to registers in the CSR module 410.

The write data and/or the frame control data are placed in separate FIFOs located in the CSR module 410. The PWM encoder 420 may start sending a data frame when the frame control FIFO is not empty.

The encoder 420 may encode the data to be transmitted into symbols (e.g., ONE or ZERO) and may send the symbol data to an external modulator 460.

The encoder 420 may also handle the transmission of certain frames of data with different priority. For example, in some embodiments, a data frame may include a pulse-per-second (PPS) transmission that may be transmitted immediately following reception of a PPS pulse from a Time of Day (ToD) data source 476. PPS data frames initiated by a PPS pulse may have priority over other data frame types. In some embodiments, PPS data frames may interrupt other data transmissions. In some embodiments, in order to avoid interrupting a frame being transmitted when a new PPS pulse arrives, the ToD data source 476 may set a signal that tells the PWM encoder 420 to delay any pending data frame transmission. This signal may be set some time before the arrival of a PPS pulse and is reset as soon as the PPS pulse occurs.

The demodulator 430 may sample a received PWM clock 470 using a high speed clock 472 and may calculate the duration for which the PWM clock 470 was high. In some embodiments, the demodulator 430 may use a 400 MHz clock 472 to sample the received PWM clock 470, which may have a clock frequency of 25 MHz.

When the first edge 210 of the clock signal 205 is detected, the demodulator 430 may start a counter that remains active for the duration of the positive pulse of the clock signal 205. In some embodiments, the counter may remain active until the second edge 220 of the clock signal 205 is detected. At the next occurrence of the repeating first edge 210, the counter value may be stored in a register and a strobe signal may be asserted to inform the decoder 440 that a new symbol is available for decoding.

In some embodiments, where more than one data bit can be encoded within a clock cycle 201 by using more than two edges of the clock signal 205, multiple counters may be used for decoding by detecting the respective additional edges within the clock cycle 201 without departing from the present inventive concepts.

The decoder 440 may convert a cycle count received from the demodulator 430 into symbols (e.g., ZERO, ONE or SPACE) and may store them in an input buffer. Multiple symbols can be combined into a data frame. When a whole data frame has been received, the decoder 440 may store it in a frame FIFO located in the CSR module 410.

The decoder 440 may receive the cycle counter numbers generated by the demodulator 430. A particular cycle counter number may be compared with minimum and maximum values programmed in the CSR module 410 and the comparison results may be used to decide what symbol was received.

An input shift register may be used to accumulate received data symbols and a parity bit may be calculated. After a predetermined number of symbols have been received (e.g. 12 bytes) for a data frame, the calculated parity bit may be compared with a parity bit received with the transmitted data. If they match, the decoder 440 may save the received data in a received-frame FIFO located in the CSR module 410. If the received frame is a PPS frame, a PPS pulse might be generated and a new ToD value may be stored.

When the decoder 440 receives a symbol other than a ONE or ZERO when the input shift register is not empty but contains fewer than the number of symbols for a full data frame, a frame error may be generated and the input shift register may be flushed.

When the decoder 440 is first enabled or a demodulation error occurs, the decoder 440 may ignore all received symbols until the next SPACE symbol, or series of SPACE symbols, is received to continue with normal operation.

In some embodiments a loopback mode can be used to test the PWM encoder 420 and decoder 440 circuitry. In this mode, the symbol codes generated by the encoder 420 may be sent directly to the decoder 40 and at the same time only SPACE symbols are sent to the modulator 460.

The timeout 450 may measure a duration since a frame was transmitted by a master PWM or received by a PWM receiver. When the duration exceeds a certain threshold, the timeout 450 may alert of the possibility of problems with the transmission/reception of that frame.

A PWM transmitter can request the destination PWM receiver to reply to a frame it receives over the clock signal 205 via a return data path, such as the remote PWM clock from the PWM receiver 470. In the case of a frame including a data read request, the reply may be mandatory or an error will be generated. If the PWM receiver does not receive the frame correctly, no reply will be sent back to the PWM transmitter. The timeout module 450 is used to detect when such events occur so that the PWM module 401 can resend the data frame. The data frame may contain a field called "command index" that associates an identification number with each data frame transmitted by the PWM transmitter. For example, the identification number could be made up of three bits with eight distinct identification codes (000b-111b).

On the PWM transmitter side, when the encoder finishes sending a data frame, it may start a timer with the same index as the command index value. If the PWM receiver receives the data frame correctly it may send a reply frame with the same command index value as the original data frame. When the PWM transmitter's decoder 440 receives the reply data frame, it may stop the timer of the timeout 450.

If an error occurs and the PWM receiver does not send the reply data frame, the counter within the timeout 450 may overflow and an interrupt may be generated. The PWM module 401 may generate an error in response to the interrupt.

The modulator 460 may be external to the PWM module 401. The modulator 460 may receive symbols codes from the PWM encoder 420 and may use them to modulate the duration of a clock cycle 201 clock signal 205 as illustrated in FIG. 3. In some embodiments, the modulation may be performed on the positive pulse of a 50 percent duty cycle clock signal having a frequency between 1.6 MHz and 25 MHz.

Figure 5:
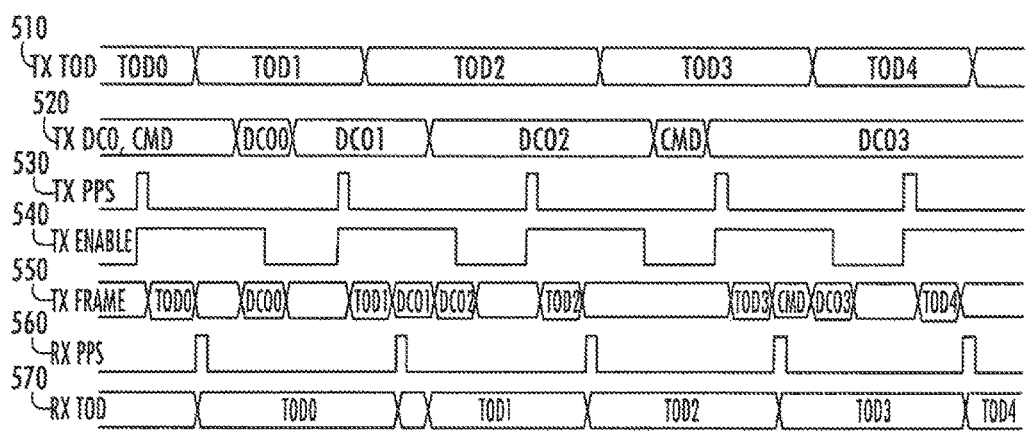
FIG. 5 is a timing diagram illustrating input and output signals of the pulse width modulation architecture illustrated in FIG. 4.

FIG. 5 is a timing diagram illustrating input and output signals of the pulse width modulation architecture 400 illustrated in FIG. 4.

As illustrated in FIG. 5, the PWM module 401 of the pulse width modulation architecture 400 may both transmit and receive signals. Included among these signals are the transmit time-of-day (ToD) signals 510, transmit digitally-controlled oscillator (DCO) and/or command (CMD) signals 520, transmission pulse-per-second (PPS) signals 530, transmission enable signals 540, transmission data frame signals 550, received PPS signals 560, and received ToD data 570. These signals are further illustrated in the example embodiment of FIG. 6.

Figure 6:
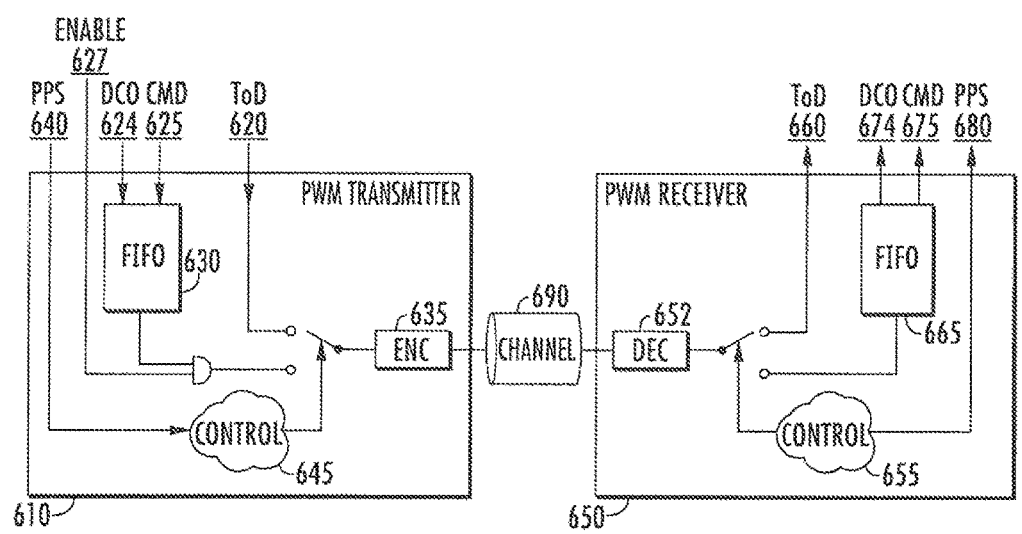
FIG. 6 is a block diagram of a transmitter architecture communicating with a receiver architecture according to some embodiments of the present inventive concepts.

FIG. 6 is a block diagram of a transmitter architecture communicating with a receiver architecture according to some embodiments of the present inventive concepts.

As illustrated in FIG. 6 and discussed herein with respect to FIG. 4, a PWM transmitter 610 may communicate with a PWM receiver 650 in some embodiments of the present inventive concepts. The PWM transmitter 610 may communicate with the PWM receiver 650 over a data channel 690 to transmit a data transmission over the clock signal 205.

The PWM transmitter 610 may take as input a PPS signal 640, a time of day signal (ToD) 620, a digitally controlled oscillator (DCO) signal 624, a command (CMD) signal 625, and an enable signal 627. The foregoing signals are merely illustrative and embodiments of the present inventive concepts may include additional signals or omit signals described herein without deviating from the present inventive concepts.

The DCO signal 624 may be provided in some example embodiments, such as example embodiments utilizing a phase lock loop (PLL). The DCO signal 624 may be used by the PLL to provide feedback on the phase signal of the PLL.

The CMD signal 625 may represent commands to be sent from the PWM transmitter 610 to the PWM receiver 650 over the data channel 690. Examples of such commands may be a data write command, a data read command, and/or a control command, though the present inventive concepts are not limited thereto.

The DCO signal 624 and/or the CMD signal 625 may be stored in a FIFO 630 on the PWM transmitter 610 for future transmission over the clock signal 205 using the data channel 690. The transmission may be enabled by an input enable signal 627.

The PPS signal 640 may be a pulse-per-second signal generated by external clocking infrastructure. The PPS signal may be used in conjunction with received ToD data 620 received at the PWM transmitter 610. The received ToD data 620 may be data including a timestamp denoting the current time. In some embodiments, the data may be the number of seconds which have elapsed since a predetermined point in the past. In some embodiments, the PPS signal 640 and the ToD data 620 may be received at the PWM transmitter 610 from a PLL. Receipt of the PPS signal 640 may trigger a transmission of the ToD data 620 to the PWM receiver 650.

The PWM transmitter 610 may prioritize transmission of the ToD data 620 upon receipt of the PPS signal 640. Accordingly, receipt of the PPS signal 640 may be input to PWM transmitter control logic 645 which may suspend or terminate any current data transmission, such as a transmission associated with a DCO 624 or CMD 625 signal, in favor of a transmission of the ToD data 620.

For example, in some embodiments, the PWM transmitter 610 may be in the process of sending a data transmission to the PWM receiver 650 when a PPS signal 640 is received. That is to say the encoder 635 of the PWM transmitter 610 may be in the process of encoding individual symbols of a data transmission when the PPS signal 640 is received. When the PPS signal 640 is received, control logic 645 may be activated to replace the ToD data 620 as the source of a data transmission to the PWM receiver 650. The prioritization of the ToD data 620 in response to the PPS signal 640 may cause the encoder 635 to pause the current data transmission to the PWM receiver 650. For example, the encoder 635 may pause or terminate the current data transmission by sending a predetermined signal to the PWM receiver 650. For example, the encoder 635 may send a SPACE symbol, or a series of SPACE symbols, to indicate a terminated transmission. Upon receipt of the predetermined signal, the PWM receiver 650 may cancel any processing of a current data transmission and wait for a new data transmission, one containing, for example, the PPS signal, to begin. In some embodiments, the PWM receiver 650 may wait until receiving a SPACE symbol to begin processing another data transmission. It will be understood by those of skill in the art that other methods for terminating the data transmission and prioritizing the PPS signal 640 are possible within the scope of the present inventive concepts.

As illustrated in FIG. 6, data transmissions of the PWM transmitter 610 may be encoded by an encoding module 635 prior to being transmitted in the clock signal 205 over the data channel 690.

On the PWM receiver 650 side, data transmissions from the data channel 690 are decoded by the decoding module 652. Decoded data transmissions may include a received data command such as a received DCO 674 or CMD 675 signal, or ToD data 660.

A received DCO or CMD transmission may be stored in a PWM receiver FIFO 665 before a DCO 674 or CMD 675 signal is sent to the system containing the PWM receiver 650. Similarly, received ToD data 660 may result in the ToD data 660 and/or a PPS signal 680 being sent to the system containing the PWM receiver 650.

As with the PWM transmitter 610, receipt of a ToD data 660 by the PWM receiver 650 may be prioritized over other commands. When the decoder 652 determines that ToD data 660 has been received, PWM receiver control logic 655 may prioritize the retransmission of the ToD data 660 and/or an associated PPS signal 680 to the system containing the PWM receiver 650 over other received signals (e.g. DCO 674 and/or CMD 675) being currently processed and/or contained in the FIFO 665.

Though FIG. 6 illustrates certain configurations of both a PWM transmitter 610 and a PWM receiver 650, the present inventive concepts are not limited thereto. For example, some embodiments may include only a PWM transmitter 610 capable of transmitting a clock signal 205 containing a data transmission. Some embodiments may include only a PWM receiver 650 to receiver a clock signal 205 containing a data transmission. In some embodiments, there may be multiple PWM transmitters 610 and/or PWM receivers 650.

In some embodiments, the data channel 690 may be an electronic coupling between the PWM transmitter 610 and the PWM receiver 650, though the present inventive concepts are not limited thereto. The data channel 690 may include electronic circuitry, radio waves, optical communication, and/or other methods of signal propagation. In some embodiments, the data channel 690 may be on a backplane of a computing system connecting a master clock signal to timing cards within the computing system.

It will be understood that processing elements of either the PWM transmitter 610 and/or the PWM receiver 650 (e.g., control logic 645, encoder 635, etc.) may be incorporated in circuitry, within logic gates such as with, for example, a Field Programmable Gate Array (FPGA) or Complex Programmable Logic Device (CPLD), and/or with a processor executing computer code.

Figure 7:
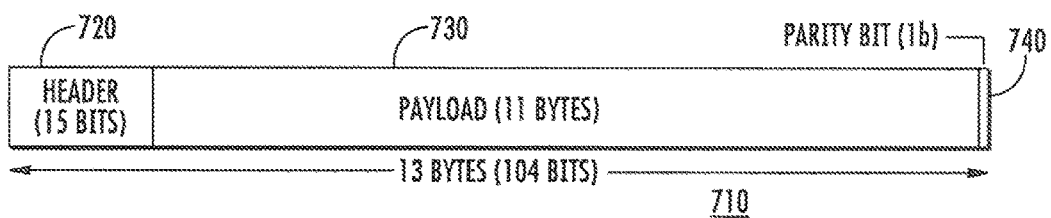
FIG. 7 is an illustrative model of a data packet for transmission over a clock signal according to some embodiments of the present inventive concepts.

FIG. 7 is an illustrative model of a data packet for transmission over a clock signal according to some embodiments of the present inventive concepts.

As illustrated the data packet 710 contains a header 720, a payload 730, and/or a parity section 740. The data packet may be encoded in the clock signal 205 according to mechanisms discussed herein with respect to FIGS. 3A and 3B.

The header 720 may contain additional information about the data packet 710. For example, the header 720 may contain a unique command code identifying the type of data contained in the payload 730. The header 720 may also contain a unique command index allowing for correlation between different data transmissions.

The payload 730 of the data packet 710 may contain the data associated with the packet. For example, if the command is a data write command, the payload 730 may contain the data to be written. If the command is a data read command, the payload 730 may identify the data (e.g. the data address or other identifying characteristic) to be read and returned to the transmitter via an alternate channel. If the command is a time of day command, the payload 730 may contain a designation of the time of day. The foregoing are provided merely as examples of possible data packet formats, but the present inventive concepts are not limited thereto.

The parity section 740 may be used to indicate if whether the 0's and 1's within the data transmission are an even or odd number. The parity section 740 may be used in parity error checking to find errors that may occur during data transmission. The parity section may also comprise other types of error checking mechanisms such as a checksum and/or a cyclical redundancy check (CRC) calculation, but the present inventive concepts are not limited thereto.

In some example embodiments, the data packet 710 may be 13 bytes (104 bits) long, with the header 720 being 15 bits, the payload 730 being 11 bytes (88 bits) long, and the parity section 740 being one bit. It will be understood that other sizes for the data packet 710, as well as the header 720, payload 730, and parity section 740 may be possible without deviating from the present inventive concepts.

Figure 8:
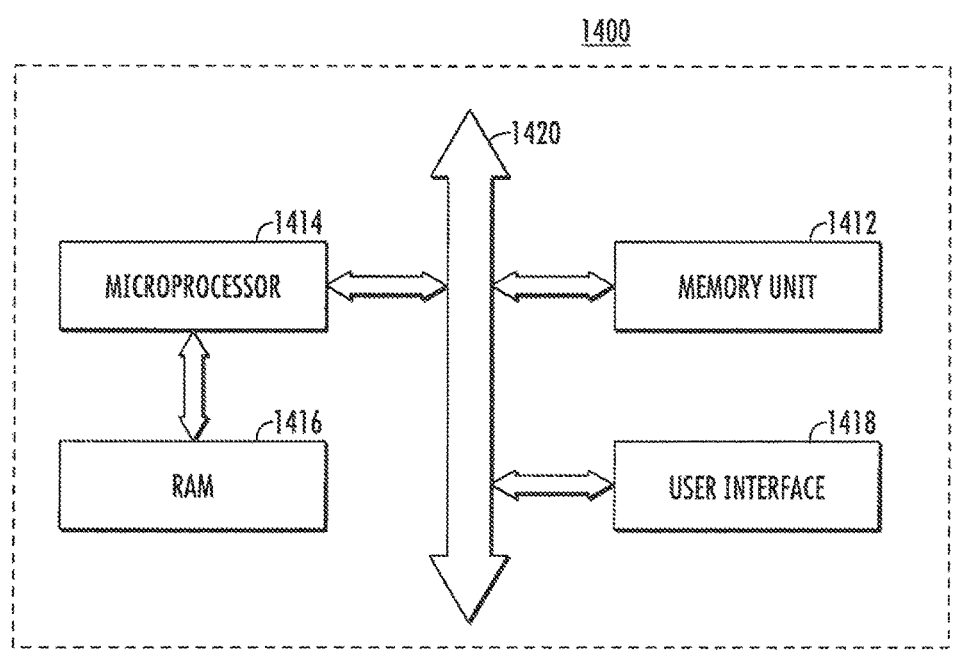
FIG. 8 is a block diagram of a processing system according to some embodiments of the present inventive concepts.

FIG. 8 is a block diagram of a processing system 1400 according to some embodiments of the present inventive concepts. The processing system 1400 may be communicatively coupled to a PWM transmitter 610 or PWM receiver 650 such as those described with respect to FIG. 6, and described with additional detail in FIG. 4. Referring to FIG. 8, a processing system 1400 may include a microprocessor 1414, a memory unit 1412, and/or a user interface 1418 configured to perform data communication using a bus 1420. The microprocessor 1414 may include a CPU or an AP. The processing system 1400 may further include a RAM 1416 in direct communication with the microprocessor 1414. The microprocessor 1414 and/or the RAM 1416 may be assembled within a single package. The user interface 1418 may be used to input data to the electronic system 1400, or output data from the electronic system 1400. For example, the user interface 1418 may include a touch pad, a touch screen, a keyboard, a mouse, a voice detector, a cathode ray tube (CRT) monitor, an LCD, an AMOLED, a plasma display pad (PDP), a printer, a lighting, or various input/output devices. The memory unit 1412 may store operational codes of the microprocessor 1414, data processed by the microprocessor 1414, or data received from the outside. The memory unit 1412 may include a memory controller, a hard disk, or a solid state drive (SSD). The microprocessor 1414, the RAM 1416, and/or the memory unit 1412 may include semiconductor devices in accordance with the present inventive concepts.

Figure 9:
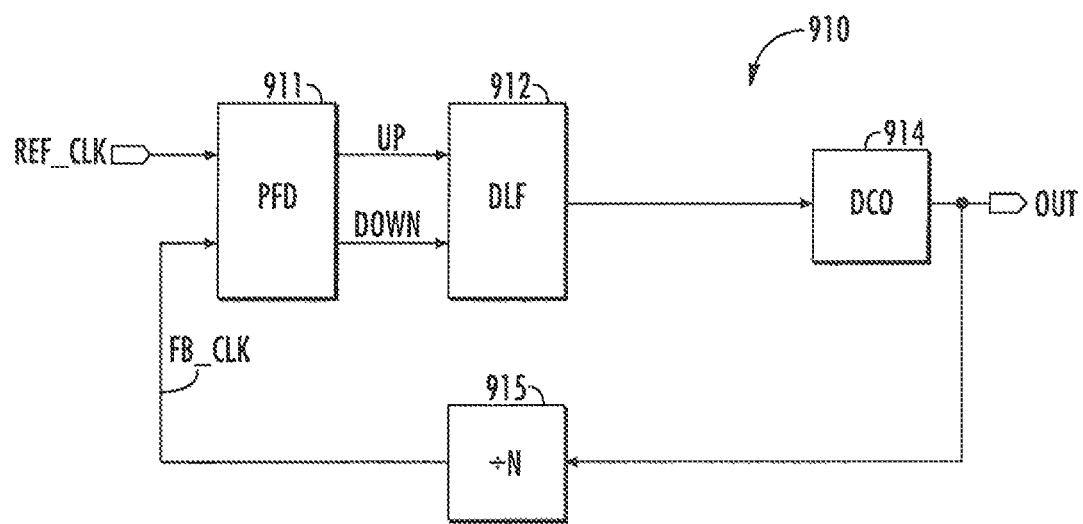
FIG. 9 is a block diagram of a phase lock loop according to example embodiments of the present inventive concepts.

FIG. 9 is a block diagram of an example digital phase lock loop 910 according to example embodiments of the present inventive concepts. The phase lock loop 910 may be communicatively coupled with a PWM transmitter 610 or PWM receiver 650 such as those described with respect to FIG. 6, and described with additional detail in FIG. 4. Referring now to FIG. 9, a conventional digital phase-locked loop (DPLL) integrated circuit 910 is illustrated as including a phase-frequency detector (PFD or PD) 911, a digital loop filter (DLF) 912, a digitally controlled oscillator (DCO) 914 and a divide-by-N feedback divider 915. As shown, the phase-frequency detector 911 generates UP and DOWN control signals to the digital loop filter 912 in response to a comparison of a relative phase offset between a reference clock (REF_CLK) and feedback clock (FB_CLK) generated by the feedback divider 915. The digital loop filter 912 may alter the frequency of the signal provided as an input to the digitally controlled oscillator 914 in response to the UP and DOWN control signals.

It will be understood that though the PLL illustrated in FIG. 9 is a digital PLL, an analog PLL is equally possible without deviating from the present inventive concepts. Similarly, though FIG. 9 illustrates a DPLL 910 with example components, other DPLL designs may be understood by those of skill in the art and may be utilized without deviating from the present inventive concepts.

In the above-description of various embodiments of the present inventive concepts, it is to be understood that the terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected," "coupled," "responsive," or variants thereof to another element, it can be directly connected, coupled, or responsive to the other element or intervening element may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present inventive concepts may be embodied in hardware and/or in software (including firmware, resident software, micro-code, etc.) that runs on a processor such as a digital signal processor, which may collectively be referred to as "circuitry," "a module," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of the present inventive concepts.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method of operating a clock circuit in a first system, comprising:
transmitting a clock signal of the clock circuit, from a transmitter of the first system to a receiver of a second system,
wherein a first repeating edge of respective ones of clock cycles within the clock signal repeats at a predetermined constant frequency within the clock signal to synchronize operations of the second system; and
varying, by the first system, a second edge of at least one of the clock cycles within the clock signal to transmit a data transmission within the clock signal.

2. The method of claim 1, wherein the respective one of the clock cycles within the clock signal comprises a period between a first occurrence of the first repeating edge of the respective one of the clock cycles within the clock signal and a second occurrence of the first repeating edge of the clock signal following, and directly time adjacent to, the first occurrence of the first repeating edge of the respective one of the clock cycles within the clock signal.

3. The method of claim 1, wherein varying, by the first system, the second edge of the at least one of the clock cycles within the clock signal comprises pulse width modulating the at least one of the clock cycles within the clock signal to provide a pulse width between the first repeating edge and the second edge responsive to a data input to the first system.

4. The method of claim 3, wherein the first system varies the second edge of the at least one of the clock cycles within the clock signal to transmit the data transmission within the clock signal by:
providing the pulse width according to a first pulse width to encode a logical zero in the data transmission; and
providing the pulse width according to a second pulse width to encode a logical one in the data transmission.

5. The method of claim 4, wherein the first system varies the second edge of the at least one of the clock cycles by pulse width modulating the at least one clock cycle within the clock signal according to one of at least the first pulse width, the second pulse width, and a third pulse width.

6. The method of claim 5, wherein the first pulse width is one-fourth of the at least one of the clock cycles,
wherein the second pulse width is three-quarters of the at least one of the clock cycles, and
wherein the third pulse width is one-half of the at least one of the clock cycles.

7. The method of claim 4, wherein the first system transmits the data transmission within the clock signal by further:
encoding the data transmission into a plurality of data symbols,
wherein a data symbol of the plurality of data symbols is encoded with a combination of data bits comprising any and all combinations of the logical one and the logical zero; and
transmitting the data symbol within the clock signal by pulse width modulating respective ones of a plurality of clock cycles within the clock signal to be the logical one or the logical zero.

8. The method of claim 7, wherein the data symbol comprises a symbol ONE, a symbol ZERO, or a symbol SPACE.

9. The method of claim 1, wherein the data transmission within the clock signal comprises a pulse per second data transmission to calibrate a clock of the second system.

10. An encoding circuit in a first system for a clock signal, comprising:
a transmitting circuit configured to transmit the clock signal to synchronize operations of a second system; and
a processing circuit configured to perform operations comprising:
encoding a data transmission for the second system into a plurality of data symbols,
wherein a data symbol of the plurality of data symbols is encoded with a combination of data bits comprising any and all combinations of a logical one and a logical zero;
transmitting, from the transmitting circuit to a receiver of the second system, the clock signal,
wherein a first repeating edge of respective ones of clock cycles within the clock signal repeats at a predetermined constant frequency within the clock signal to synchronize operations of the second system; and
varying a second edge of at least one of the clock cycles within the clock signal so as to transmit the data transmission within the clock signal.

11. The encoding circuit of claim 10, wherein varying the second edge of the at least one of the clock cycles within the clock signal comprises pulse width modulating the at least one of the clock cycles within the clock signal to provide a pulse width between the first repeating edge and the second edge responsive to a data input to the first system.

12. The encoding circuit of claim 11, wherein the processing circuit varies the second edge within the at least one of the clock cycles of the clock signal so as to transmit the data transmission within the clock signal by:
providing the pulse width according to a first pulse width to encode the logical zero in the data transmission; and
providing the pulse width according to a second pulse width to encode the logical one in the data transmission.

13. The encoding circuit of claim 12, wherein the processing circuit varies the second edge within the at least one of the clock cycles of the clock signal so as to transmit the data transmission within the clock signal by further:
transmitting the data symbol within the clock signal by pulse width modulating respective ones of a plurality of clock cycles within the clock signal to be the logical one or the logical zero.

14. The encoding circuit of claim 10, wherein the processing circuit is further configured to perform operations comprising:
receiving a pulse per second data transmission at the processing circuit to be transmitted to the second system;
terminating a first data transmission in progress to the second system;
transmitting the pulse per second data transmission as a second data transmission to the second system; and
retransmitting the first data transmission to the second system after completion of the second data transmission.

15. A decoding circuit in a second system for a clock signal, comprising:
a receiving circuit configured to receive the clock signal from a first system; and
a processing circuit configured to perform operations comprising:
receiving, from a transmitter of the first system, the clock signal, wherein a first repeating edge of respective ones of clock cycles within the clock signal repeats at a predetermined constant frequency within the clock signal to synchronize operations of the second system;

decoding a data transmission that is encoded by the first system from the clock signal into a plurality of data symbols, wherein the data transmission is encoded by varying a second edge of at least one of the clock cycles within the clock signal; and performing operations responsive to the data transmission that is encoded by the first system.

16. The decoding circuit of claim 15, wherein a data symbol of the plurality of data symbols received is encoded with a combination of data bits comprising any and all combinations of a logical one and a logical zero.

17. The decoding circuit of claim 16, wherein decoding the data transmission encoded by the first system from the clock signal into the plurality of data symbols comprises detecting a varying pulse width between the first repeating edge and the second edge of the at least one of the clock cycles within the clock signal.

18. The decoding circuit of claim 17, wherein the processing circuit decodes the data transmission within the clock signal by:

detecting the varying pulse width according to a first pulse width to decode the logical zero in the data transmission; and detecting the varying pulse width according to a second pulse width to decode the logical one in the data transmission.

19. The decoding circuit of claim 15, wherein the processing circuit is further configured to perform operations comprising:

receiving in a first data transmission within the clock signal an indication that a pulse per second data transmission is available from the first system;

terminating the first data transmission in progress from the first system;

receiving the pulse per second data transmission as a second data transmission from the first system; and receiving the first data transmission from the first system after completion of the second data transmission.

20. The decoding circuit of claim 15, wherein the decoding circuit is contained within a phase-lock loop control system of the second system.

* * * * *